US 9,202,299 B2

(12) United States Patent
Edwin et al.

(10) Patent No.: US 9,202,299 B2
(45) Date of Patent: Dec. 1, 2015

(54) HINT BASED SPOT HEALING TECHNIQUES

(71) Applicant: Adobe Systems Incorporated, San Jose, CA (US)

(72) Inventors: Anand Samuel Edwin, Bangalore (IN); Komal Kumar Desai, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 104 days.

(21) Appl. No.: 14/136,734

(22) Filed: Dec. 20, 2013

(65) Prior Publication Data

US 2015/0178965 A1 Jun. 25, 2015

(51) Int. Cl.
*G06K 9/03* (2006.01)
*G06K 9/40* (2006.01)
*G06T 11/60* (2006.01)
*G06F 3/0484* (2013.01)
*G06T 5/00* (2006.01)

(52) U.S. Cl.
CPC ............ *G06T 11/60* (2013.01); *G06F 3/04845* (2013.01); *G06T 5/005* (2013.01); *G06T 2207/30201* (2013.01)

(58) Field of Classification Search
CPC .................... G06T 11/60; G06T 5/005; G06T 2207/30201; G06F 3/04845

USPC .......................................... 382/274–275, 311
See application file for complete search history.

(56) References Cited

U.S. PATENT DOCUMENTS

| | | | | | |
|---|---|---|---|---|---|
| 5,974,201 | A | * | 10/1999 | Chang | G06F 17/30277 382/128 |
| 6,160,923 | A | * | 12/2000 | Lawton et al. | 382/275 |
| 8,457,442 | B1 | * | 6/2013 | Wang et al. | 382/285 |
| 2009/0245603 | A1 | * | 10/2009 | Koruga | A45D 44/00 382/128 |
| 2013/0129158 | A1 | * | 5/2013 | Wang | G06K 9/00 382/118 |

\* cited by examiner

*Primary Examiner* — Kanjibhai Patel
(74) *Attorney, Agent, or Firm* — Wolfe-SBMC

(57) ABSTRACT

Hint-based spot healing techniques are described. In one or more implementations, techniques are described in which a user may provide input as a hint used to automatically determine features in an image to process for application of a selected image editing operation. The user may select a feature in an image exposed for editing using touch input or another input technique. The image is then processed based on the hint to identify additional features that match a spot pattern of the user selected feature. A visual representation of feature set that includes the selected feature and the additional features is presented and an option to designate (e.g., deselect or select) features on an individual basis is provided to refine the feature set. The image editing operation is then applied to the designated features in the feature set.

19 Claims, 12 Drawing Sheets

HINT BASED SPOT HEALING TECHNIQUES

BACKGROUND

Consumer photo editing is on the rise due at least in part to wide availability of the mobile phones, tablets, and other portable devices that include cameras and are powerful enough to support image editing software. A variety of different editing operations may be applied to process an image. One example is a spot healing operation in which unwanted features such as facial blemishes and lens artifacts may be selectively removed from an image. Traditional tools designed to perform spot healing are complex and may not be well suited for mobile platforms and unsophisticated consumers. Moreover, existing spot healing tools designed to globally remove defects often are over selective and therefore may wrongly detect and remove desired features as noise. Due to the complexity of image editing software, users may simply choose not to use the software or may be frustrated when they perform editing operations and fail to achieve acceptable results.

SUMMARY

Hint-based spot healing techniques are described. In one or more implementations, techniques are described in which a user may provide input as a hint used to automatically determine features in an image to process for application of a selected image editing operation. The user may select a feature in an image exposed for editing using touch input or another input technique. The image is then processed based on the hint to identify additional features that match a spot pattern of the user selected feature. A visual representation of feature set that includes the selected feature and the additional features is presented and an option to designate (e.g., deselect or select) features on an individual basis is provided to refine the feature set. The image editing operation is then applied to the designated features in the feature set.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
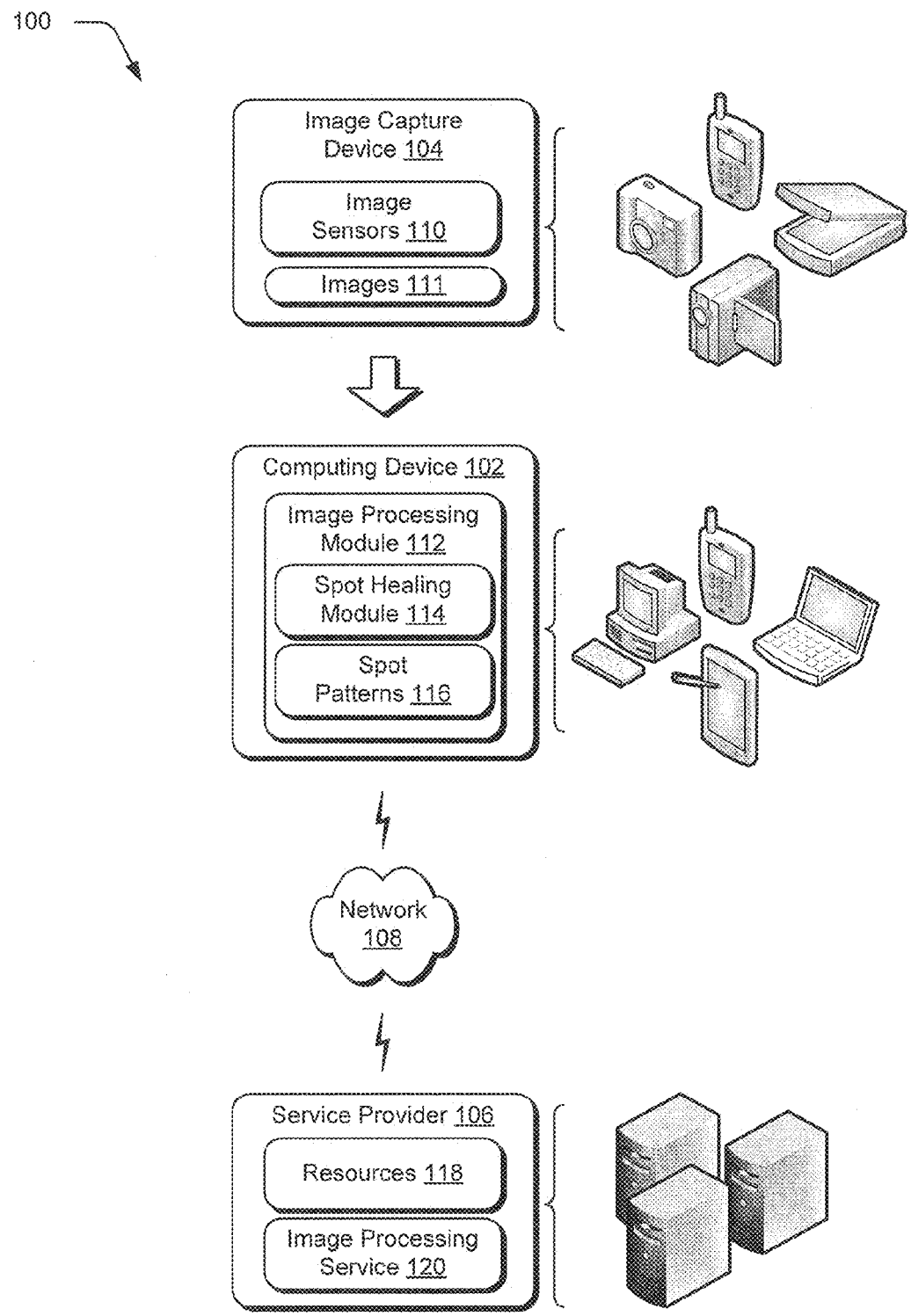
FIG. 1 is an illustration of an environment in an example implementation that is operable to employ techniques described herein

Users may take advantage of photo editing software to enhance digital photos in various ways. In one example, the photo editing software may provide tools to fix spots such as facial blemishes, dirt spots, and other unwanted defects. Traditional tools designed to perform spot healing are complex and may not be well suited for mobile platforms and unsophisticated consumers. Moreover, existing spot healing tools designed to globally remove defects often are over selective of noise in a target image and therefore may wrongly detect and remove desired features as noise. Due to the complexity of image editing software, users may simply choose not to use the software or may be frustrated when they perform editing operations and fail to achieve acceptable results.

Hint-based spot healing techniques are described herein. In one or more implementations, a hint-based spot healing tool configured to use selection of features in image as a hint for spot removal is incorporated with an image editing platform such as Adobe Photoshop™, Adobe Photoshop Elements™, or another photo editing application. In particular, a user may load a digital image for editing via a photo editing application and provide input as a hint regarding a feature or type of feature the user wants to edit. For example, the user may interact directly with the image to select a facial blemish like a pimple or sunspot using touch based input, a mouse, or other input techniques. The hint provided by the user is then employed to automatically determine similar features and apply an image editing operation to the selected features. Generally, the selected features are unwanted features such as an image defect, a blemish, or unwanted detail in the image. In operation, the image is processed based on the hint to automatically identify additional features that match a spot pattern of the user selected feature that defines noise characteristics of the feature. For example, a noise detection algorithm may use a spot pattern for the user selected feature to find portions of the image that have similar noise characteristics. Since the detection is based on the user hint, the detection may be more accurate and less likely to wrongly remove desirable features as noise in comparison to traditional automatic tools that attempt to recognize any characteristics designated as noise found within the entire image.

Once features are selected, a visual representation of a feature set including the selected feature and the additional features is presented and an option to designate (e.g., deselect or select) features on an individual basis may be provided to refine the feature set. For example, selectable indicators placed proximate to the feature or a preview pane that shows a close-up view of each individual feature may be employed to provide a representation of the feature set that is derived based on the hint Additionally, functionality may be incorporated with the representation that enables further user input to toggle inclusion of individual features in the feature set back and forth. Accordingly, in response to providing the hint, a user is able to preview the "potential" feature set prior to applying the image editing operation and explicitly designate features the user wants to keep or discard for the feature set. The image editing operation is then applied to the features that are kept in the feature set as designated by the user.

In the following discussion, an example environment is first described that may employ the techniques described herein. Example details and procedures are then described which may be performed in the example environment as well as other environments. Consequently, example details and procedures are not limited to the example environment and the example environment is not limited to example details and procedures described herein.

Example Environment

FIG. 1 is an illustration of an environment 100 in an example implementation that is operable to employ techniques described herein. The illustrated environment 100 includes a computing device 102 and an image capture device 104, which may be configured in a variety of ways. Additionally, the computing device 102 may be communicatively coupled to one or more service providers 106 over a network 108. Generally speaking, a service provider 106 is configured to make various resources (e.g., content, services, web applications, etc.) available over the network 108, such as the Internet, to provide a "cloud-based" computing environment and web-based functionality to clients.

The computing device 102 may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations. Additional details and examples regarding various configurations of computing devices, systems, and components suitable to implement aspects of the techniques described herein are discussed in relation to FIG. 12 below.

The image capture device 104 represented in FIG. 1 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, a laptop, a mobile phone or other implementation of a computing device having a built in image capture device 102. The image capture device 104 is illustrated as including image sensors 106 that are configured to form images 111. In general, the image capture device 102 may capture and provide images 111 via the image sensors 106 that may be stored on and further processed by the computing device in various ways. Naturally, images 111 may be obtained in other ways also such as by downloading images from a website, accessing images from some form of computer readable media, and so forth.

The images 111 may be obtained by an image processing module 112. As before, although the image processing module 112 is illustrated as being implemented on a separate device it should be readily apparent that other implementations are also contemplated in which the image sensors 106 and image processing module 112 are implemented on the same device. Further, although illustrated as being provided by a computing device 102 in a desktop configuration, a variety of other configurations are also contemplated, such as remotely over a network 108 as service provided by a service provider, a web application, or other network accessible functionality.

Regardless of where implemented, the image processing module 112 is representative of functionality operable to manage images 111 in various ways. Functionality provided by the image processing module 112 to manage images may include but is not limited to functionality to organize, access, browse and view images, as well as to perform various kinds of image processing operations upon selected images. By way of example and not limitation, the image processing module 112 may include or otherwise make use of a spot healing module 114. The spot healing module 114 is representative of functionality to perform one or more image editing operations related to spot healing. This may include various hint-based spot healing techniques that are based at least in part on "hints" from users regarding features/defects to process. In general, the spot healing module 114 is configured to enable selection of a feature in an image as a user selected hint and perform processing to automatically identify additional, similar features contained in the image based on characteristics of the selected feature. Then, an image editing operation may be applied to modify or correct the selected feature as well as the similar features that are automatically identified. Moreover, the spot healing module 114 may collect and maintain a history of user interaction that may be used to inform subsequent image editing operations.

The spot healing module 114 may include or make use of a library of spot patterns 116 that are detectable for image processing operations. The spot patterns 116 are representative of data files or records that includes details of noise characteristics for different types of defects. In particular, the spot patterns 116 are configured to define noise characteristics for different types of features that may be recognized using a suitable noise detection algorithm. By way of example and not limitation, the noise characteristics may include parameters such as intensity, size, shape, color, and patterning characteristics associated with features, to name a few examples. The spot patterns 116 may include pre-defined patterns as well as some patterns that are generated on-demand in response to a user hint or derived from a history of user interaction that is collected. Further, the spot patterns 116 may represent various different types of unwanted features including image defects (e.g., streaks, spots, dirt, lenses, artifacts), blemishes (pimples, acne, hair, cuts, freckles, birthmarks, etc.) or unwanted image details (obscuring objects such as trees/branches or people in a scenic shot; background objects including people, animals, objects; distracting items such as lettering or images on signs or clothing, bandages, toys, food and beverage, etc.).

As further shown in FIG. 1, the service provider 106 may be configured to make various resources 118 available over the network 114 to clients. In some scenarios, users may sign up for accounts that are employed to access corresponding resources from a provider. The provider may authenticate credentials of a user (e.g., username and password) before granting access to an account and corresponding resources 118. Other resources 118 may be made freely available, (e.g., without authentication or account-based access). The resources 118 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

For example, the service provider 106 in FIG. 1 is depicted as including an image processing service 120. The image processing service 120 represents network accessible functionality that may be made accessible to clients remotely over a network 108 to implement aspects of the techniques described herein. For example, functionality to manage and process images described herein in relation to image processing module 112 and spot healing module 114 may alternatively be implemented via the image processing service 120 or in combination with the image processing service 120. Thus, the image processing service 120 may be configured to provide cloud-based access operable for hint-based spot healing as well as other operations described above and below.

Hint-Based Spot Healing Details

Figure 2:
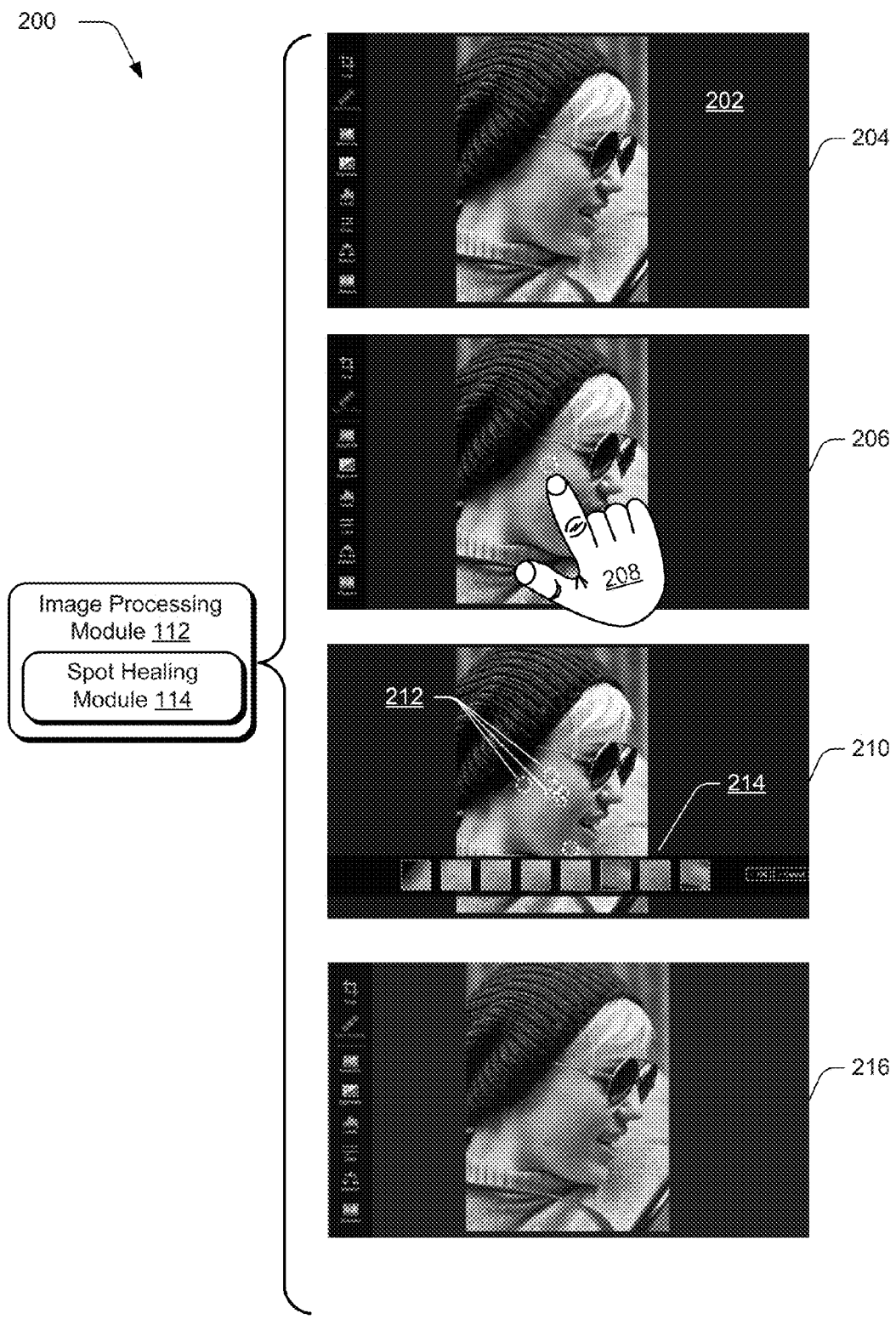
FIG. 2 depicts a system in an example implementation in which operation of an image processing module to perform image editing operations is depicted.

FIG. 2 depicts a system 200 in an example implementation in which operation of the image processing module 112 and spot healing module 114 of FIG. 1 is represented in connection with one or more image editing operations. The system 200 is shown using different illustrative stages of processing of an image 111 in connection with an image editing operation. The image 111 may be obtained, directly from one or more image sensors 106, from storage upon on some form of computer-readable media, by downloading from a web site, and so on.

As shown in FIG. 2, the image 111 may be exposed for editing within a user interface 202 associated with the image processing module 112 as represented by stage 204. The user interface 202 may provide functionality operable to perform various image editing operations upon the image 111. In an implementation, the user interface 202 may be configured to support touch interaction in addition to or in lieu of input via a mouse, keyboard or other input device. Functionality for various image editing operations may be provided using one or more different types of user interface instrumentalities such as selectable icons, menu items, lists, key combinations, tool bars, interactive dialogs, or pop-up elements, to name some examples. Thus, a user may interact to view, edit, navigate, select, and otherwise manipulate an image or a library of images using functionality accessible via the user interface 202.

In the context of hint-based spot healing techniques described herein, the user interface 202 may be configured to support automatic or semi-automatic healing of features in the image. In one approach, healing may occur based on user selection of a particular feature as a hint for noise detection that is employed to detect similar features. For example, stage 206 in FIG. 2 represents a selection 208 by a user of a feature within the image, which in this example is a pimple on the face of a woman in the image. Here, the selection 208 occurs by touch interaction although other types of input may alternatively be employed as discussed herein. The selection 208 of the feature may be visually represented in the interface using any suitable indicators. In the depicted example, a dashed selection circle appears around the selected feature to visually represent the selection. Other indicators to designated features, such as boxed areas, flags placed proximate to the features, checkmarks, and so forth are also contemplated.

Based on the selection 208, the image processing module 112 and spot healing module 114 may operate to determine noise characteristics associated with the selected feature. Here, a spot pattern 116 may be generated on-demand or a pre-existing spot pattern that matches the selected feature may be accessed from a library or other suitable storage location. Once a spot pattern 116 associated with the selected feature is ascertained, the spot pattern 116 is employed to find additional features in the image that match the spot pattern 116 and therefore also match the user selected feature. This may occur by applying a noise detection algorithm configured to use noise characteristics indicated by the spot pattern 116 associated with the selected feature to find features having comparable noise characteristics.

As shown at stage 210, a feature set 212 having the user selected feature and the additional features that match the user selected feature may be visually represented in the user interface 202 responsive to the selection 208 and processing to find the additional features. Here, each feature of the feature set 212 is represented using a dashed selection circle, although other indicators may also be employed as noted above.

Additionally, the user interface 202 may be configured to provide functionality selectable to designate one or more features from the feature set 212 to include when a spot healing operation (or other selected image editing operation is applied). A user therefore may select a feature as a hint, be presented with a visual representation of a feature set 212 derived based on the hint, and de-select and select features from the feature set on an individual basis prior to application of an image editing operation to the feature set. In the case of a touch-based device/interface, the de-selection and selection of features may occur using touch interaction. In one approach, the indicators used to represent the feature set may be configured as selectable elements that enable de-selection/selection of individual features. Here, a user may directly interact with features within the image to designate features for a particular editing operation.

In addition or alternatively, a preview pane may be exposed to represent the feature set and enable the de-selection/selection of individual features. An example preview pane 214 is represented in FIG. 2. Here, the preview pane includes image elements for each feature in the feature set 212. In an implementation, the image elements may present a relatively larger, zoomed-in preview view (e.g., close-up view) of each feature relative to the source image. The image elements may also be individually selectable to cause the de-selection/selection individual features for the particular editing operation.

As shown at stage 216, a particular editing operation is applied to selected features of the feature set. In the depicted example, none of the features are deselected and accordingly the editing operation is applied to the entire feature set 212. In the case of a spot healing operation, a suitable noise removal algorithm may be applied to the features to remove or de-emphasize the appearance of the features. This may involve pixel and texture blending using portions of the image surrounding the feature to replace the "unwanted" pixels of the features and implement the correction. Accordingly, the various pimples appearing in the original image have been removed in the image appearing at stage 216.

Figure 3:
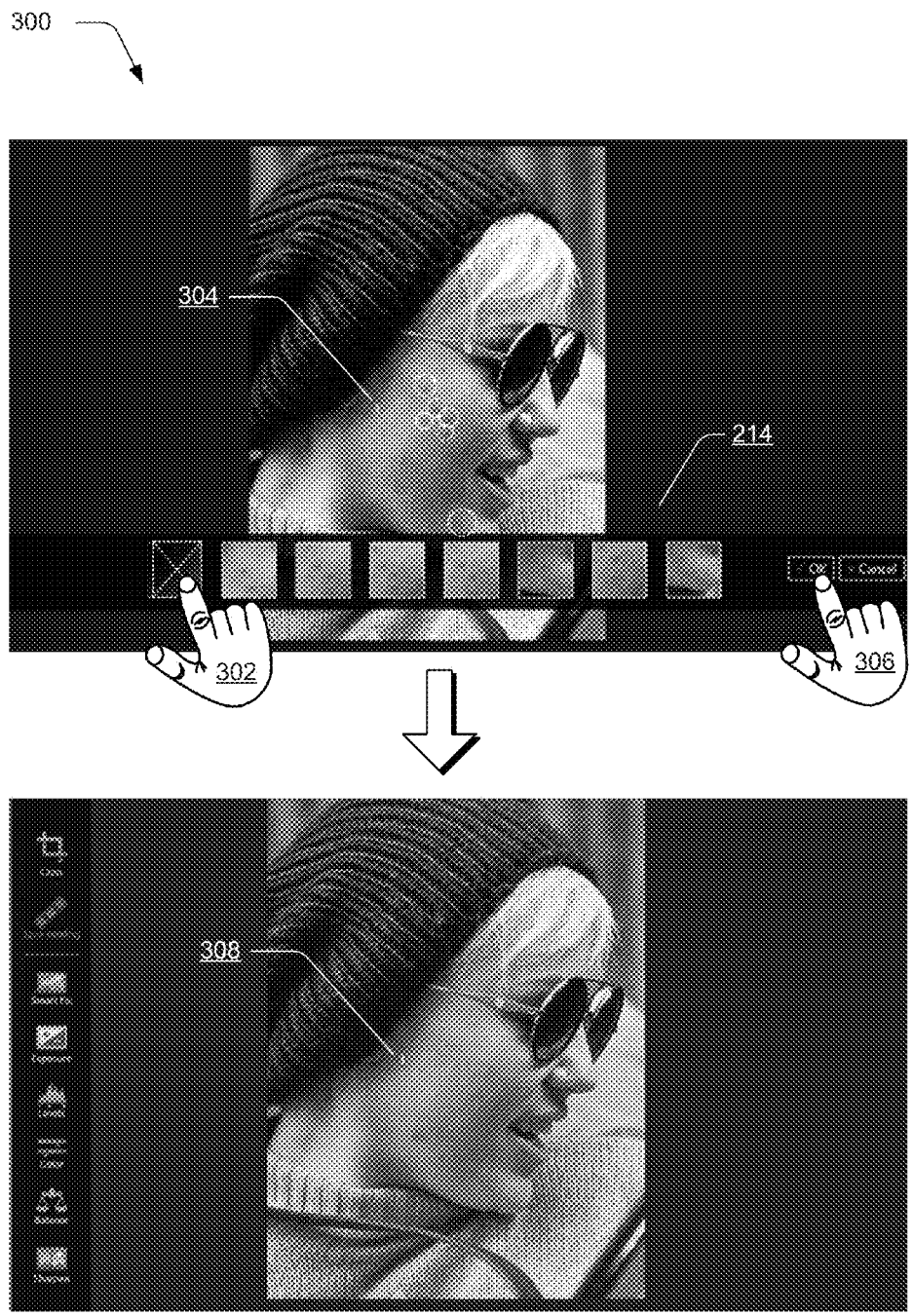
FIG. 3 depicts details of a preview pane in accordance with one or more implementations.

A detailed example illustrating operation of the viewing pane 214 for designation of particular features from a feature set is shown in relation to FIG. 3. In particular, FIG. 3 depicts generally at 300 a representation of the viewing pane 214 in which a selection 302 is made to de-select one of the features of the feature set 212 derived as discussed in relation to FIG. 2. Here, the de-selection occurs by touching or otherwise interacting with an image element for the particular feature in the preview pane. The de-selection action may cause toggling between a selected state and a de-selected state for the underlying feature. The de-selection may be visually represented in various ways such as by placing an "X" across the image element as shown, graying-out the image element, removing the element from the pane, or toggling an indicator such as a checkmark icon to name some examples. Additionally, a visual representation of the de-selected feature may be toggled also as shown at 304 where the indicator (e.g., dashed selection circle) for the de-selected feature has been removed. Now, when a selection 306 is made to apply an editing operation, the de-selected feature is not corrected and the feature remains in the image as shown at 308.

Additional details regarding techniques for hint-based spot healing are described in relation to some user interface and scenario examples shown in FIGS. 4 to 9. Although aspect of techniques discussed herein are described in the context of spot healing operations, it should be appreciated that the techniques are not limited to spot healing operations and may be generally applicable to different image editing operations that may be applied to a collection of similar features. Thus, the hint-based selection of features described herein and use of spot patterns learned from user interaction to inform subsequent operations may be applied in a variety of contexts of which the spot healing operations are but one example.

Figure 4:
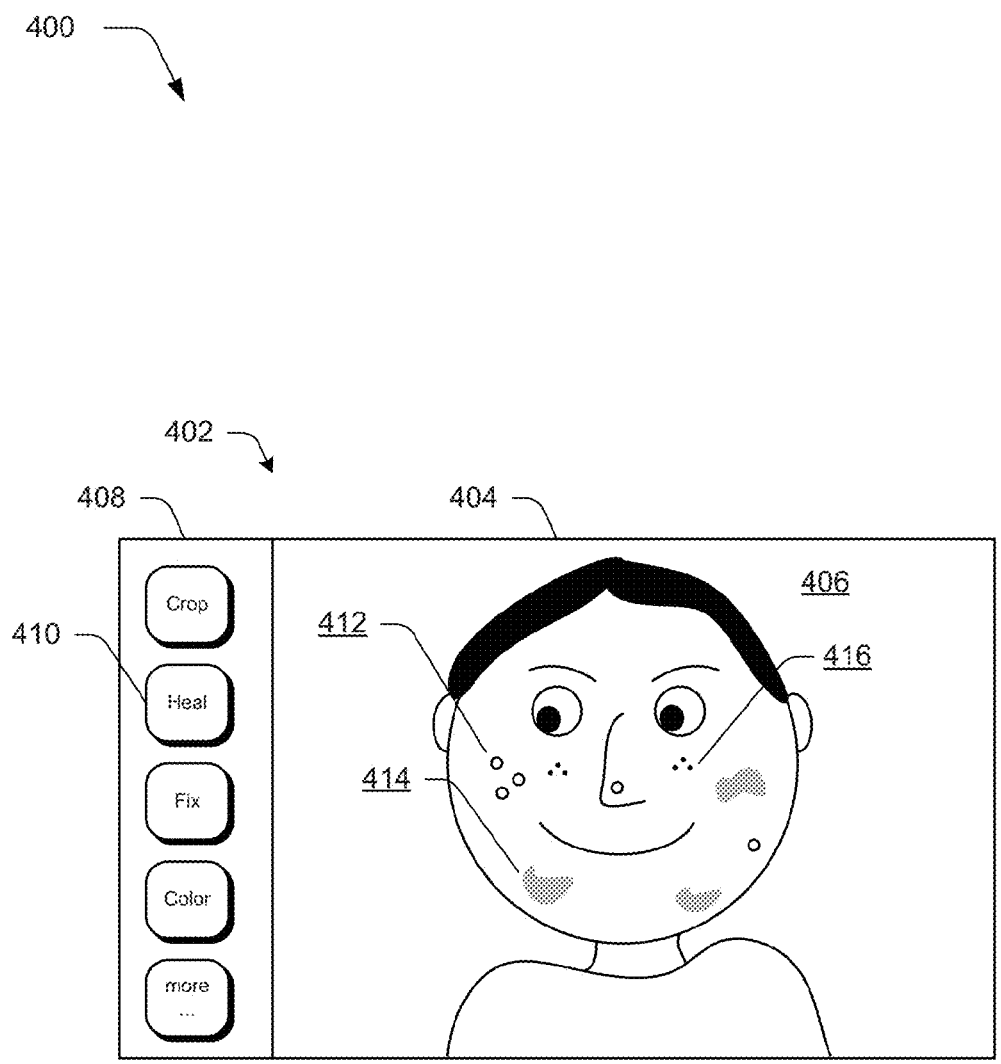
FIG. 4 depicts an example interface having an image for editing that may be the subject of image editing operations.

FIG. 4 depicts generally at 400 in an example implementation of a user interface 402. The example user interface may be exposed via an image processing module 112 as previously mentioned. The user interface 402 may include an image display area 404 in which an image 406 is presented. The presented image 406 may be viewed and manipulated in various ways by a user using functionality provided by the image processing module 112. Various functionality may be accessible via a tools menu 408, which in this example is as a tool bar having selectable icons corresponding to various tools and image editing operations. Other configuration of a tools menu 408 are also contemplated such as a menu bar, a pop-up tool box, or other suitable configuration that facilitate selection from among various functionality provided by the image processing module 112. As represented in FIG. 4, the tools menu 408 may implement at least a spot healing tool 410 operable to cause spot healing on selected features as discussed herein.

The image 406 also represents various different features (e.g., image defects, blemishes, or details) to which the image editing functionality may be applied in various scenarios. The example features in FIG. 4 include pimples 412, skin blotches 414, and freckles 416. In this case, the examples features relate to facial blemishes or aspects, although other types of features may be involved in other scenarios example of which were discussed previously.

As discussed in relation to the following example scenarios, the user interface 402 may be configured in various ways to facilitate image editing operations including hint-based spot healing. More generally, the user interface 402 enables user selection of a selected feature, which may cause automatic detection of similar additional features to produce a feature set having the selected feature and the additional features. A spot healing operation or other designated operation may then be applied to the feature set or at least some designated features in the feature set. Different types of features may be selected and corrected sequentially. Moreover, the hint-based approach described herein enables users to explicitly indicate unwanted features and preserve wanted features. Still further, the image processing module 112 may be configured to learn new spot patterns 116 based on user interactions and use the learned patterns to make more accurate predictions for subsequent editing scenarios.

Figure 5:
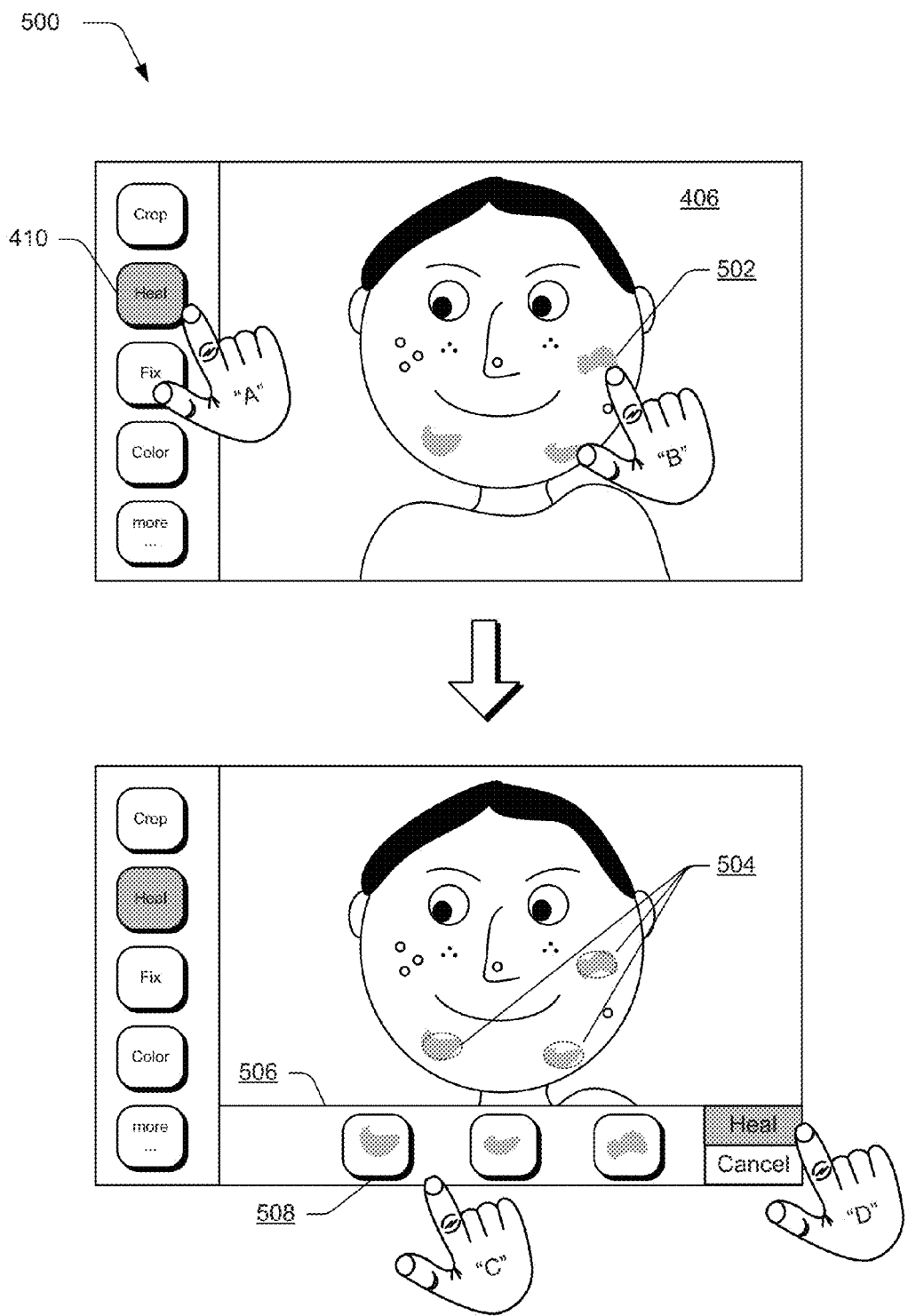
FIG. 5 depicts a representation of an example interaction scenario in accordance with one or more implementations.
Figure 6:
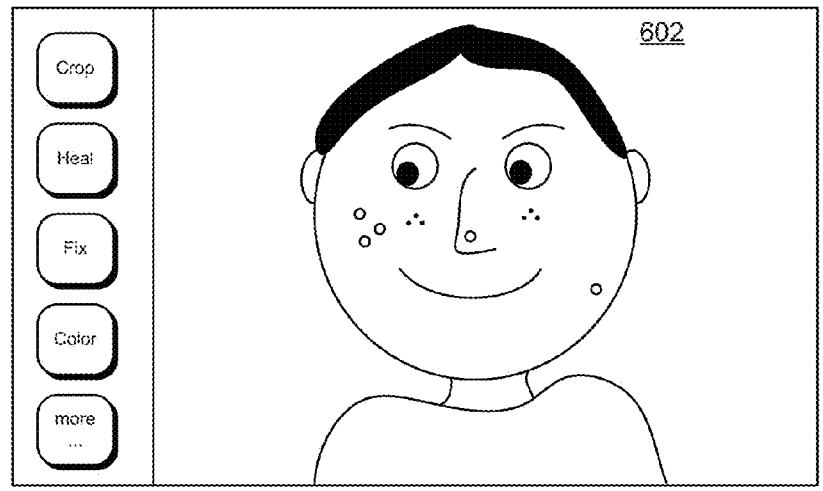
FIG. 6 depicts a representation of a processed image that may result in response to the example interaction of FIG. 5

For instance, FIGS. 5 and 6 show an interaction scenario in which a selected type of feature in the example image 406 of FIG. 4 is removed using the spot healing tool 410. For example, FIG. 5 depicts generally at 500 interaction in which a user selects the spot healing tool 410 at "A" and makes a selection of a feature 502 within the image 406 at "B". In particular, one of the skin blotches 414 of FIG. 4 is selected. Now, the image processing module 112 operates to detect and visually represent a feature set 504 that includes the selected skin blotch and similar blotches. Additionally or alternatively, a preview pane 506 may be exposed to show image elements 508 that provide a preview and close-up view of the individual items in the feature set in the manner previously discussed. Detection of similar blotches may occur by using a spot pattern corresponding to the selected blotch and processing the image 406 to find areas in the image that match the spot pattern. This may be accomplished by using the spot pattern to inform a noise detection algorithm. If a preview pane 506 is presented, then a user may interact to make a designation of particular items of the feature set at "C". Then, a selection to apply the selected image editing operation at "D" causes application of the image editing operation to designated features. In this example, spot healing operations corresponding to the spot healing tool 410 are applied to remove the skin blotches 414 of the feature set 504. Accordingly, FIG. 6 depicts generally at 600 a representation of a processed image 602 that is produced based upon the interaction described in relation to FIG. 5. Here, the processed image 602 does not include the skin blotches 414.

Figure 7:
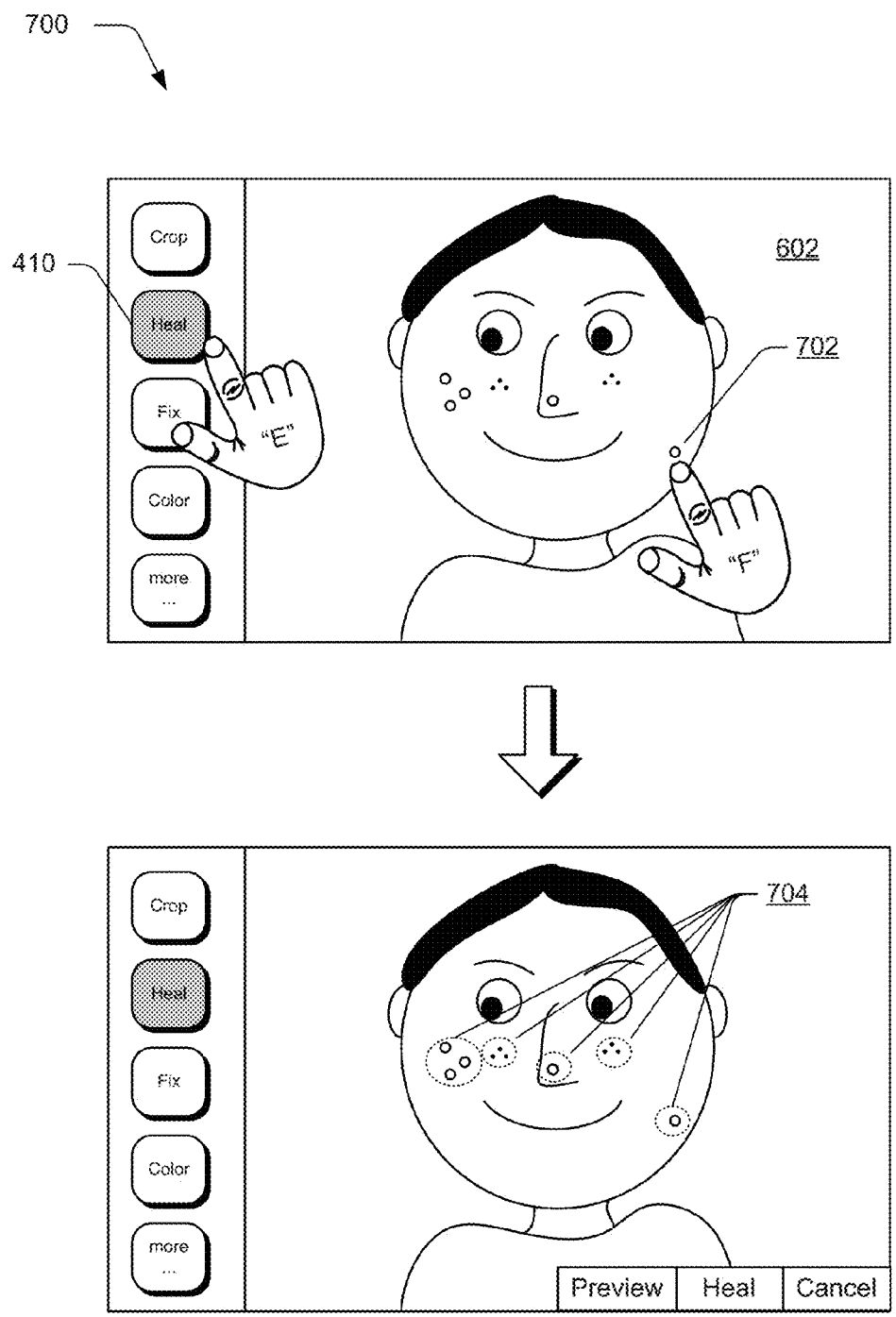
FIG. 7 depicts another representation of an example interaction scenario in accordance with one or more implementations.
Figure 8:
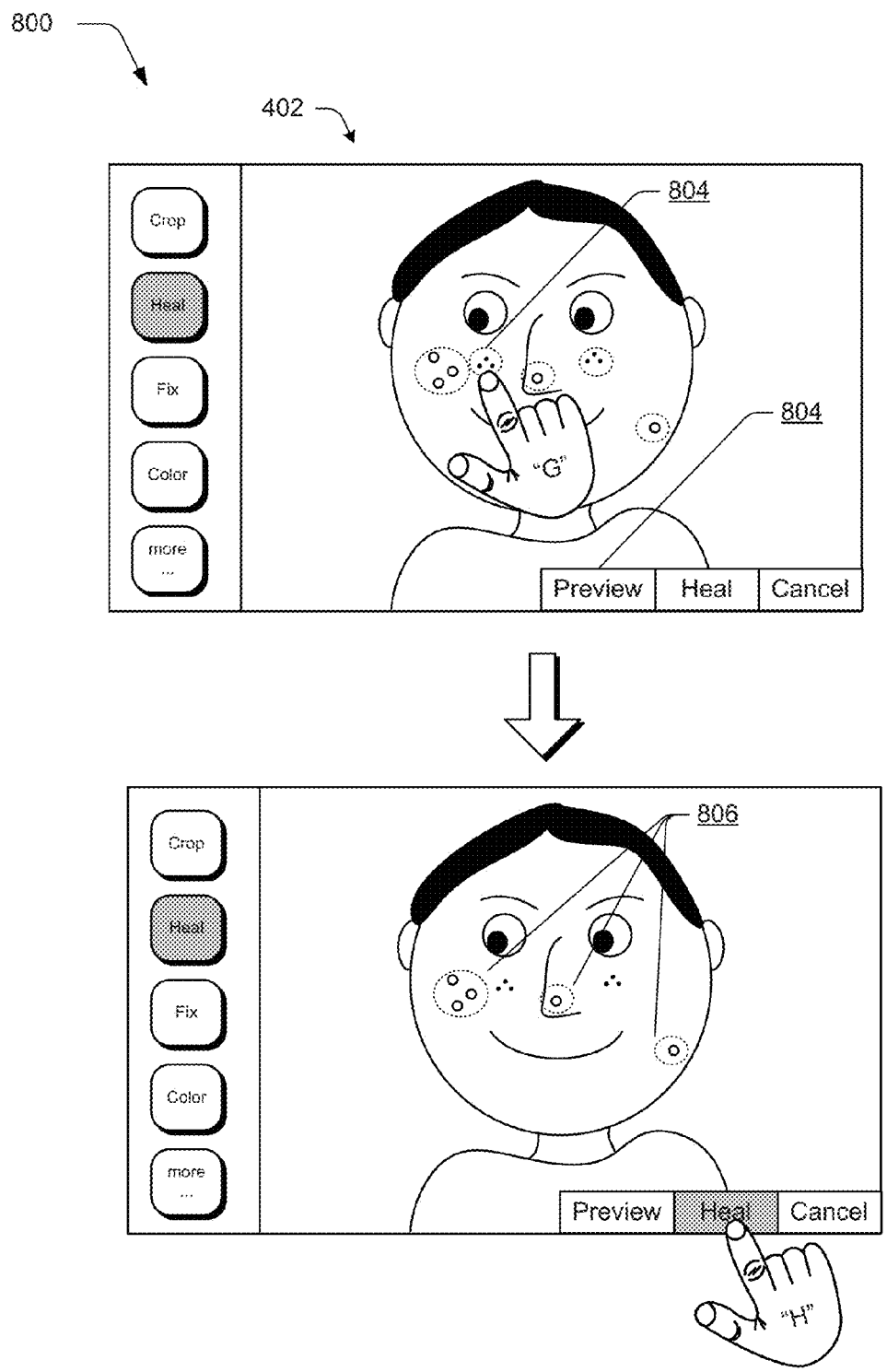
FIG. 8 depicts designation of individual features for in accordance with one or more implementations.
Figure 9:
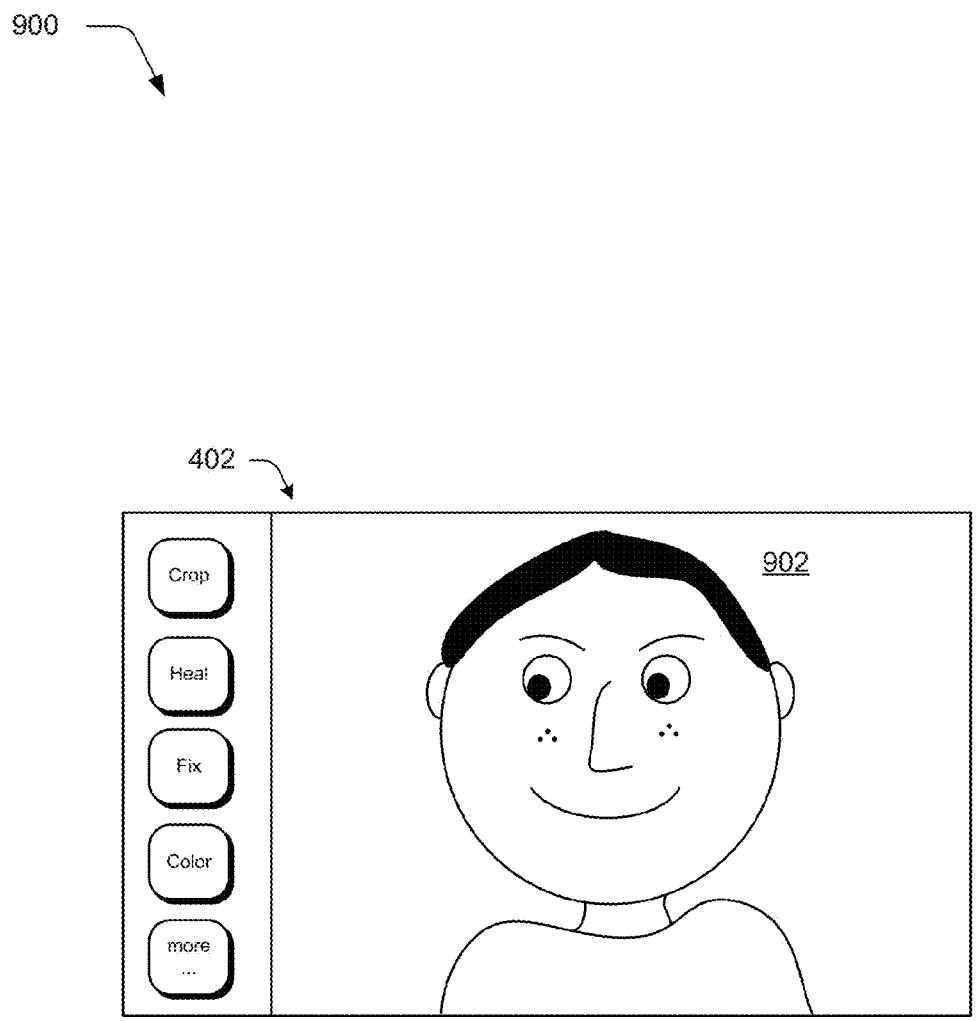
FIG. 9 depicts a representation of a processed image that may result in response to the example interactions described in relation to FIGS. 5 to 9.

FIGS. 7 to 9 show another interaction scenario in which another type of feature in an example image is removed using the spot healing tool 410. In this example, the interaction may be performed upon the processed image 602 after removing the skin blotches 414 as just described. Accordingly, different types of features may be selectively removed/processed in succession using the described techniques. For example, FIG. 7 depicts generally at 700 interaction in which a user again selects the spot healing tool 410 at "E" and makes a selection of a feature 702 within the image 406 at "F". In particular, one of the pimples 412 of FIG. 4 is selected. In response, the image processing module 112 again detects and visually represents a feature set 704 that includes the selected pimple and similar features that may be detected based on a spot pattern 116 associated with the pimple. Here, however the feature set 704 is illustrated as including both pimples 412 and freckles 416 shown in FIG. 4. The depicted scenario is intended to represent a situation in which some features that a user may want to keep in the image (or exclude from processing) are including in the feature set. As mentioned, though, functionality may be provided to designate individual features of the feature set to which a selected image editing operation is applied. This may occur by enabling de-selection/selection of the features in various way via the user interface, examples of which were previously discussed.

FIG. 8 depicts generally at 800 interaction in which features for application of an image editing operation are designated from a feature set. For instance, a feature set 704 of FIG. 7 that includes the selected feature 702 and additional features identified by matching with a spot pattern associated with the selected feature 702 may be visually represented in the user interface 402 as shown in FIG. 8. Here, the indicators for the representation of the feature set 704 may be configured as selectable elements that enable selection/de-selection of items in the feature set on an individual basis. A preview pane such as the example preview pane 506 shown in FIG. 5 may be employed in addition to or in lieu of providing selectable indicators to enable the designation of features. In one approach, the preview pane may be selectively displayed through operation of a control or other user interface instrumentality, an example of which is the preview button 802 represented in FIG. 8. Thus, the preview pane may be used alone or in combination with selectable indicators to allow a user to selectively designate features for a spot healing operation or other editing operations. Other techniques to facilitate designation of features from a feature set are also contemplated.

In the example of FIG. 8, interaction to deselect a feature 804 is shown at "G". This may involve touch input upon the corresponding indicator for the feature 804. In particular, freckles in the image that are automatically selected for the feature set in connection with the user-selected pimple in the example of FIG. 7 may be de-selected to preserve the freckle and exclude the freckles from processing. The de-selection represented at "G" may be repeated for each feature of the feature set that the user wants to exclude from the processing. Here, the user may want to preserve the freckles and therefore may interact to deselect all the freckles to refine the feature set. Accordingly, a refined feature set 806 may be formed responsive to user interaction to designate particular items from the feature set for inclusion in the set or to remove from the feature set. Visual representations of the feature set in the user interface may be modified accordingly to reflect the user's explicit designations. Thus, the indicators for the de-selected freckles are depicted as being removed in FIG. 8 following the de-selection represented at "G." Once a user is satisfied with the feature set, the user may interact to apply the image editing operation to items in the feature set. For instance, a selection to apply the selected image editing operation at "H" causes application of the image editing operation to designated features. In this example, spot healing operations corresponding to the spot healing tool 410 are applied to remove the pimples 412 maintained in the feature set 806.

FIG. 9 depicts generally at 900 a representation of a processed image 902 following hint-based editing operations. The processed image 902 reflects the interaction described in relation to FIGS. 5 to 8 to perform image processing on features of the image based on user hints Here, the processed image 902 does not include the pimples 412 or skin blotches 414 shown in the image 406 of FIG. 4. However, the freckles 416 that the user de-selected from the feature set to exclude from the processing and keep in the image remain in the processed image 902.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example of FIGS. 1-9.

Figure 10:
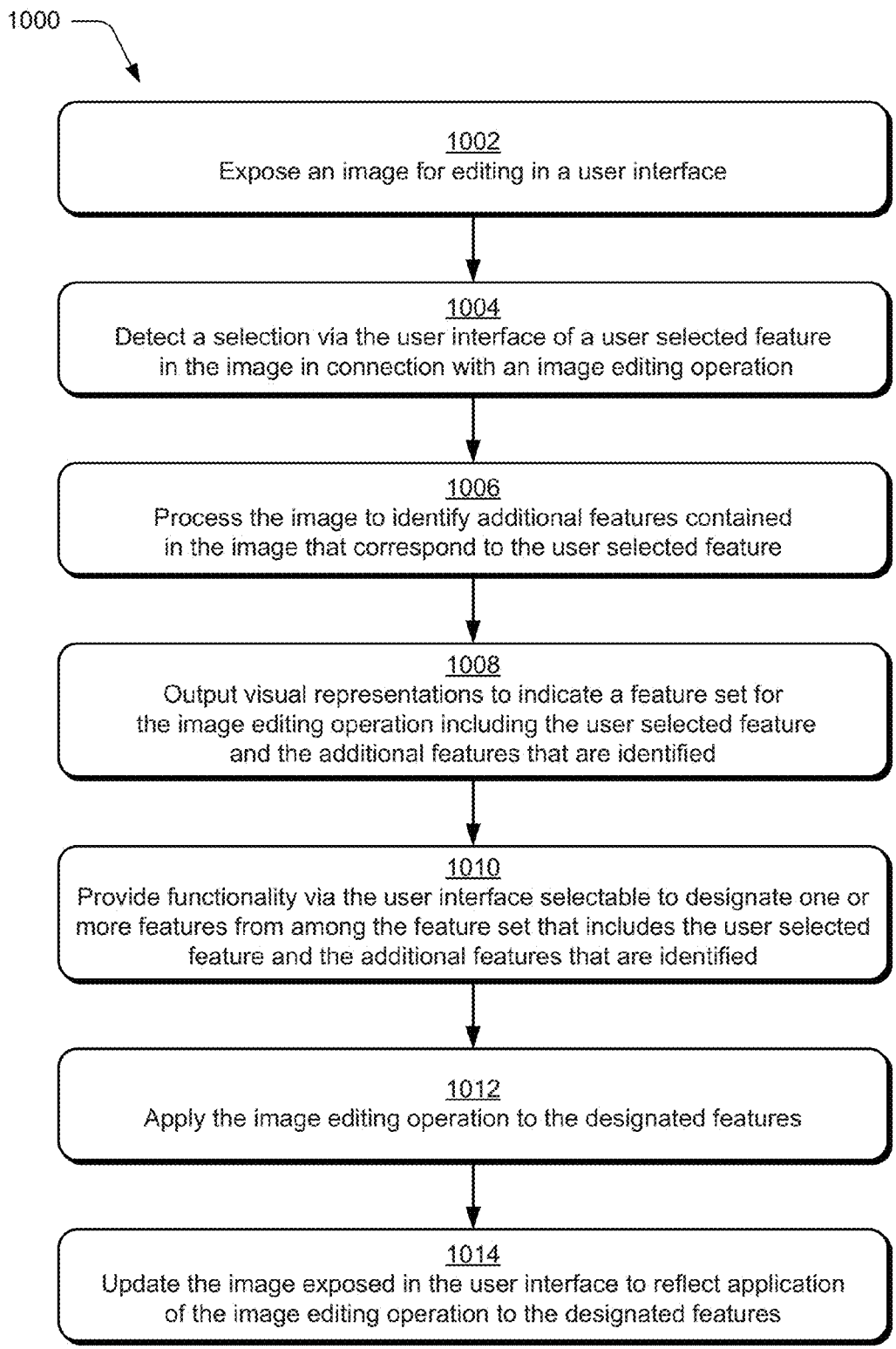
FIG. 10 is a flow diagram depicting a procedure in an example implementation in which hint-based image editing operations are performed.

FIG. 10 depicts a procedure 1000 in an example implementation in which an image editing operation is performed based upon a user hint. An image is exposed for editing in a user interface (block 1002). For example, an image processing module 112 may be invoked to view and process images as discussed herein. The image processing module 112 may support spot healing operations via a spot healing module 114 as well as other functionality for managing and performing image editing operations upon images. A selected image may be exposed for editing via a user interface provided by or otherwise associated with the image processing module 112.

A selection is detected, via the user interface, of a user selected feature in the image in connection with an image editing operation (block 1004). The selection may occur in various ways including a touch-based selection or a selection using an input device (e.g., mouse, keyboard, etc.). Features that are selectable for processing may include various unwanted features such as image defects, blemishes, or unwanted details in the image.

Responsive to the selection, the image is processed to identify additional features contained in the image that correspond to the user selected feature (block 1006) and visual representations are output to indicate a feature set for the image editing operation including the user selected feature and the additional features that are identified (block 1008). Identification of the additional features may occur by generating a spot pattern associated with the user selected feature and finding portions of the image that match the spot pattern. For example, a spot pattern may be used as input to a noise detection algorithm to discover portions within the image that have a matching spot pattern. The noise detection algorithm may be configured to compare noise characteristics of the user selected feature as defined by the spot pattern to noise characteristics of portions of the image. Based on the analysis, portions of the image that match the noise characteristics may be recognized as additional features. Accordingly, the additional features may represent features that have similar characteristics as a user selected feature that are detected based on noise analysis performed upon the image.

In addition, features included in the feature set may be visually represented within the user interface in various ways. For example, visual indications may be rendered within the image proximate to each of the features included in the feature set. The visual indications are configured to indicate features that are selected for the current operation, such as the dashed circles appearing in the examples of FIGS. 2-9. In addition or alternatively, a preview pane that includes preview images for each of the features included in the feature set may be employed to visually represent the feature set. The indicators, preview pane, or other visual representations may be provide to identify each feature in the feature set including the user selected feature and the additional features that are identified.

Additionally, functionality is provided via the user interface selectable to designate one or more features from among the feature set that includes the user selected feature and the additional features that are identified (block 1010). For instance, visual indications rendered within the image proximate to each of the features may be selectable to toggle selection and de-selection of features in the feature set on an individual basis. This may occur via direct interaction with selectable indicators associated with each feature in the image. If a preview pane is employed, preview images in the page may be configured as selectable elements that are selectable to toggle the de-selection and selection of features included in the feature set on the individual basis. Thus, a user is able to refine the feature set prior to applying an image editing operation by making explicit designations of features to include in the feature set or remove from the feature set.

The image editing operation is applied to the designated features (block 1012) and the image exposed in the user interface is updated to reflect application of the image editing operation to the designated features (block 1014). In the case of a spot healing operation, a noise removal algorithm may be applied to remove or diminish the appearance of features in the feature set. This may occur by replacing pixels of the unwanted features with pixels of "good" textures from surrounding areas. Additionally, pixel blending may occur to smooth out variation and make the corrected region appear natural. The image in the user interface may be re-rendered to reflect application of the image editing operation to the designated features. In the case of a spot healing operation, the image defects blemishes, or unwanted details selected for healing may appear to be substantially removed from the image following the spot healing operation.

In addition to enabling hint-based spot healing, the image processing module 112 may be configured to perform automatic spot healing or other editing operations that are based in part upon information gathered from user hints. For instance, spot patterns for features selected by a user may be recorded as the user interacts with images to perform hint-based spot healing andr other hint-based operations. The recorded spot patterns may be maintained in a library of spot patterns associated with the image processing module 112. The library may contain pre-defined patterns supported by the image processing module 112 (e.g., a default library produced by a developer of the image processing module) and other patterns that are learned from prior user interaction with the image processing module. The learned spot patterns may be learned on a per user basis for each individual user. Then, automated editing operations performed via the image processing module 112 may be informed by the learned patterns as well as the patterns included in the default library to refine automatic detection and processing of features for the automated editing operations.

Figure 11:
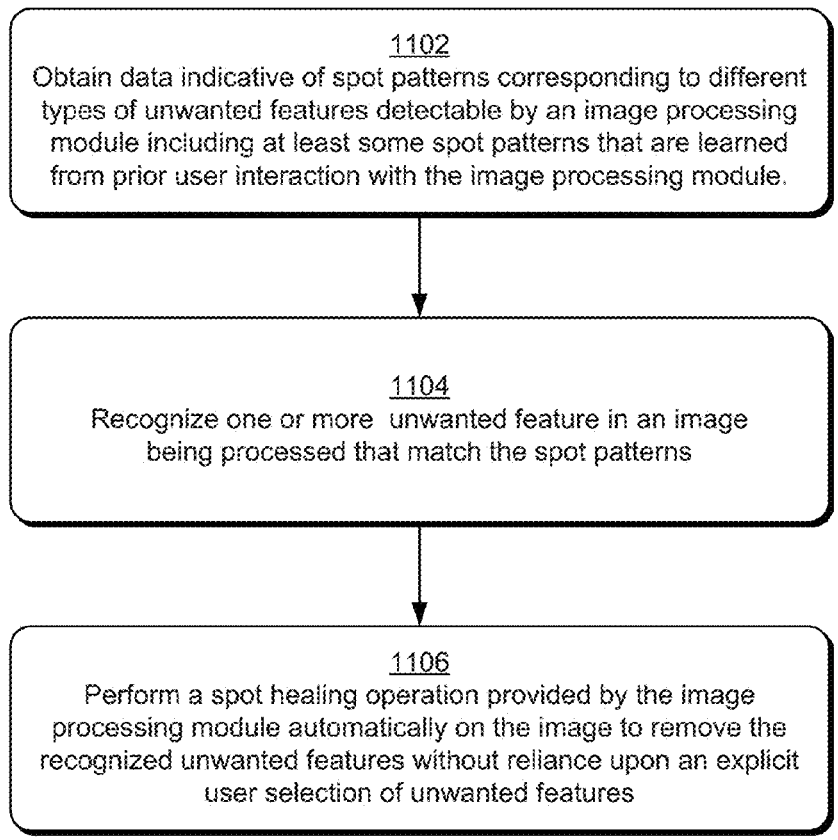
FIG. 11 is a flow diagram depicting a procedure in an example implementation in which spot patterns derived from prior user interaction are used to inform image editing operations.

To further illustrate, consider FIG. 11 which is a flow diagram depicting a procedure 1100 in an example implementation in which spot patterns derived from prior user interaction are used to inform image editing operations. In particular, when a user performs hint-based operations spot patterns for selected items may be generated and stored in a library. In other words, custom spot patterns may be learned based on user behaviors and interaction with an image processing module to manipulate image. The spot patterns may then be employed to refine automatic detection techniques and recognition of features used for subsequent editing operations.

In particular, data is obtained that is indicative of spot patterns corresponding to different types of unwanted features detectable by an image processing module including at least some spot patterns that are learned from prior user interaction with the image processing module (block 1102). The data indicative of spot patterns may be obtained by referencing spot patterns from a library associated with the image processing module. The library may be configured to contain both spot patterns that are learned from prior user interaction and pre-defined or default spot patterns. Thus, learned patterns may be used in combination with a set of pre-defined patterns that the system may support by default.

One or more unwanted features in an image being processed are recognized that match the spot patterns (block 1104) and a spot healing operation provided by the image processing module is performed automatically on the image to remove the unwanted features without reliance upon an explicit user selection of features (block 1106). Here, the unwanted features may be detected automatically responsive to invocation of an automatic spot healing tool by a user. Rather than relying upon a hint or explicit user selection of features, the detection in this scenario is based upon a library of detectable spot patterns. The library of detectable spot patterns, however, contains at least some learned patterns that may be derived based on past user interaction, such as when the user has previously performed hint-based spot healing. Over time, the automatic spot healing tool may become better and better at recognizing and suggesting types of features that a particular user may wish to edit. Thus, as a user interacts more and more with the image processing system, the automatic techniques provided by the image processing system may become more refined and tailored to the user's individual usage and behaviors.

Example System and Device

Figure 12:
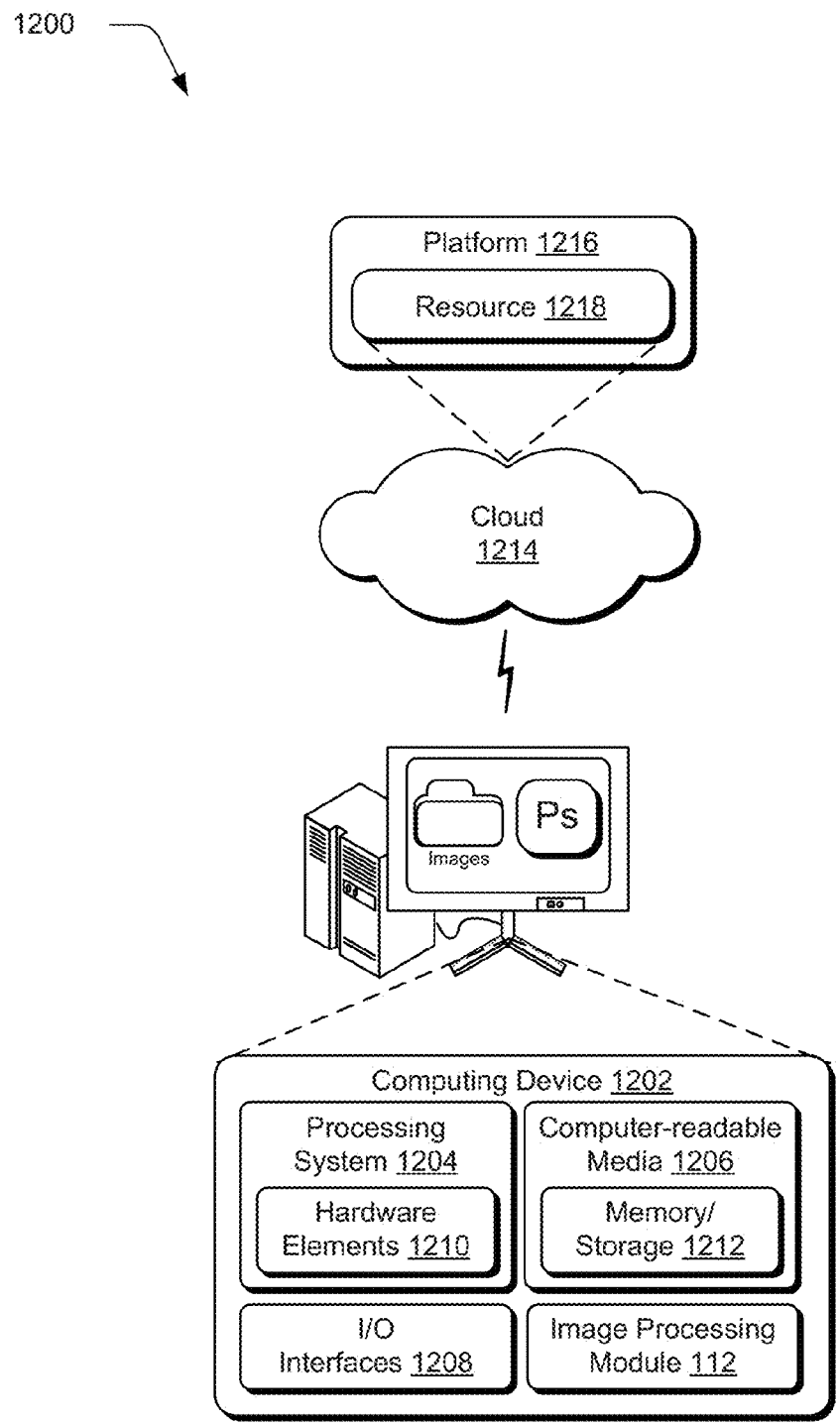
FIG. 12 illustrates an example system including various components of an example device that can be implemented as any type of computing device as described or utilized with reference to FIGS. 1 to 11 to implement embodiments of the techniques described herein.

FIG. 12 illustrates an example system generally at 1200 that includes an example computing device 1202 that is representative of one or more computing systems and devices that may implement the various techniques described herein. This is illustrated through inclusion of the image processing module 112, which may be configured to process image data, such as image data captured by an image capture device 104. The computing device 1202 may be, for example, a server of a service provider, a device associated with a client (e.g., a client device), an on-chip system, or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" refers to media and devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media including by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and functions may be executable/operable by one or more articles of manufacture (for example, one or more computing devices 1202 and processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes or is representative of a platform 1216 for resources 1218. The platform 1216 abstracts underlying functionality of hardware (e.g., servers) and software resources of the cloud 1214. The resources 1218 may include applications or data that can be utilized while computer processing is executed on servers that are remote from the computing device 1202. Resources 1218 can also include services provided over the Internet or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. A method for automatic spot healing implemented by a computing device comprising:
   detecting a selection via a user interface of a user selected feature in an image exposed for editing in the user interface in connection with an image editing operation;
   processing the image to identify additional features contained in the image that correspond to the user selected feature by generating a spot pattern associated with the user selected feature and finding portions of the image that match the spot pattern;
   providing functionality via the user interface selectable to designate one or more features for the image editing operation from among a feature set that includes the user selected feature and the additional features that are identified; and
   applying the image editing operation to designated features.

2. A method as described in claim 1, wherein the user selected feature comprises an unwanted feature and the additional features comprise similar features detected based on noise analysis performed upon the image.

3. A method as described in claim 1, wherein finding portions of the image that match the spot pattern comprises comparing noise characteristics of the user selected feature defined by the spot pattern to noise characteristics of portions of the image and recognizing portions of the image that match the noise characteristics as the additional features.

4. A method as described in claim 1, wherein the image editing operation is configured as a spot healing operation that when applied substantially removes the designated features from the image.

5. A method as described in claim 1, wherein the functionality to designate one or more features enables user de-selection and selection of the user selected feature and the additional features that are identified on an individual basis prior to applying the image editing operation.

6. A method as described in claim 1, further comprising outputting visual representations to indicate the feature set for the image editing operation that includes representations for the user selected feature and the additional features that are identified.

7. A method as described in claim 6, wherein the visual representations comprise visual indications rendered within the image proximate to each of the features included in the feature set.

8. A method as described in claim 7, wherein the visual representations are selectable for de-selection and selection of features included in the feature set on an individual basis.

9. A method as described in claim 6, wherein the visual representations comprise a preview pane that includes preview images for each of the features included in the feature set.

10. A method as described in claim 9, wherein the preview images are selectable to toggle the de-selection and selection of features included in the feature set on an individual basis.

11. A method as described in claim 1, further comprising:
   learning a spot pattern associated with the user selected feature; and
   storing the spot pattern for subsequent use to automatically recognize features in image having matching spot patterns.

12. A system comprising:
   one or more hardware elements;
   an image processing module implemented at least partially via the hardware elements to perform image processing operations including:
   exposing an image for editing via the image processing module within a corresponding user interface;
   providing functionality via the user interface selectable to designate one or more features for an image editing operation from among a feature set that includes:
   a user selected feature; and
   additional features that are identified by comparing a spot pattern for the user selected feature with portions of the image to detect portions that match the spot pattern as the additional features; and
   applying the image editing operation to features of the feature set that are designated.

13. A system as described in claim 12, wherein the functionality provided via the user interface selectable to designate one or more features comprises a preview pane having preview images selectable to individually de-select and select features in the feature set for the image editing operation.

14. A system as described in claim 12, wherein the image editing operation comprises a spot healing operation to remove the features of the feature set that are designated.

15. A system as described in claim 12, wherein the image processing operations further include:
   receiving input to select the user selected feature in the image;
   processing the image to determine the spot pattern for the user selected feature and identify the additional features based on a comparison of the spot pattern to portions of the image; and
   visually representing in the user interface the feature set including the user selected feature and the additional features that are identified as potential features for the image editing operation.

16. A system as described in claim 12, wherein the image processing operations further include updating the image exposed in the user interface to reflect application of the image editing operation to the designated features.

17. One or more computer-readable storage media storing instructions that, responsive to execution by a computing device, are configured to cause the computing device to perform operations for automatic spot healing comprising:
   obtaining data indicative of spot patterns corresponding to different types of unwanted features detectable by an image processing module including at least some spot patterns that are learned from prior user interaction with the image processing module;
   recognizing one or more unwanted features in an image being processed that match the spot patterns; and
   performing an automatic spot healing operation provided by the image processing on the image to remove the recognized unwanted features without reliance upon an explicit user selection of unwanted features.

18. One or more computer-readable storage media as described in claim 17, wherein obtaining the data indicative of spot patterns comprises referencing the spot patterns from a library associated with the image processing module configured to contain both the spot patterns that are learned from prior user interaction and pre-defined spot patterns.

19. One or more computer-readable storage media as described in claim 17, wherein the instructions are further configured to cause the computing device to perform operations for hint-based spot healing comprising:
   detecting a selection of a user selected feature contained in a particular image exposed for editing, the selection used as a hint to detect additional features contained in the particular image that match the user selected feature and generate a feature set of potential features for a spot healing operation including the user selected feature and the additional features that are detected;
obtaining a designation of features for the spot healing operation by de-selection and selection of the candidate features in the feature set on an individual basis; and
applying the spot healing operation in accordance with the designation to remove features in the feature set that are designated from the particular image.

\* \* \* \* \*